(12) United States Patent
Nakasho et al.

(10) Patent No.: US 8,120,318 B2
(45) Date of Patent: Feb. 21, 2012

(54) BATTERY CHARGER FOR TWO TYPES OF RECTANGULAR BATTERY PACKS

(75) Inventors: Toshiki Nakasho, Sumoto (JP); Koichi Inoue, Sumoto (JP); Hideyo Morita, Minami Awaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 364 days.

(21) Appl. No.: 12/609,276

(22) Filed: Oct. 30, 2009

(65) Prior Publication Data
US 2010/0109605 A1 May 6, 2010

(30) Foreign Application Priority Data
Nov. 6, 2008 (JP) .................................. 2008-285960

(51) Int. Cl.
*H02J 7/00* (2006.01)
(52) U.S. Cl. .................. 320/110; 320/107; 320/113
(58) Field of Classification Search .................. 320/107, 320/110, 113; D13/107
See application file for complete search history.

(56) References Cited

U.S. PATENT DOCUMENTS

| | | | | |
|---|---|---|---|---|
| 4,816,735 A | * | 3/1989 | Cook et al. | 320/110 |
| 5,187,422 A | * | 2/1993 | Izenbaard et al. | 320/110 |
| 5,656,914 A | * | 8/1997 | Nagele et al. | 320/110 |
| 5,686,811 A | * | 11/1997 | Bushong et al. | 320/110 |
| 6,124,699 A | * | 9/2000 | Suzuki et al. | 320/110 |
| 6,265,845 B1 | * | 7/2001 | Bo et al. | 320/113 |
| 6,617,824 B1 | * | 9/2003 | Zedell et al. | 320/110 |
| 6,774,605 B2 | * | 8/2004 | Usui et al. | 320/112 |
| 7,187,156 B2 | * | 3/2007 | Nakasho et al. | 320/107 |
| 7,468,596 B2 | * | 12/2008 | Shum | 320/110 |
| 7,741,807 B2 | * | 6/2010 | Satsuma | 320/107 |
| 7,956,573 B1 | * | 6/2011 | Rosen | 320/110 |
| 8,067,922 B2 | * | 11/2011 | Phelps et al. | 320/110 |

FOREIGN PATENT DOCUMENTS

| | | |
|---|---|---|
| JP | 11-41826 | 2/1999 |
| JP | 11-041826 | * 12/1999 |

* cited by examiner

*Primary Examiner* — Richard V Muralidar
(74) *Attorney, Agent, or Firm* — Wenderoth, Lind & Ponack, LLP

(57) ABSTRACT

The battery charger is provided with a holding cavity 2 that allows a first rectangular battery pack 30 and a second rectangular battery pack 40 to be loaded in a detachable fashion. The holding cavity has a rectangular opening and has first charging terminals 5A to contact first rectangular battery pack electrode terminals 32, and second charging terminals 5B to contact second rectangular battery pack 40 electrode terminals 42 established on a first perimeter wall 4A and second perimeter wall 4B, which are perpendicular. The battery charger charges the first rectangular battery pack through the first charging terminals when it is loaded in the holding cavity with electrode terminals 32 in contact with the first charging terminals. The battery charger charges the second rectangular battery pack through the second charging terminals when it is loaded in the holding cavity with electrode terminals in contact with the second charging terminals.

21 Claims, 9 Drawing Sheets

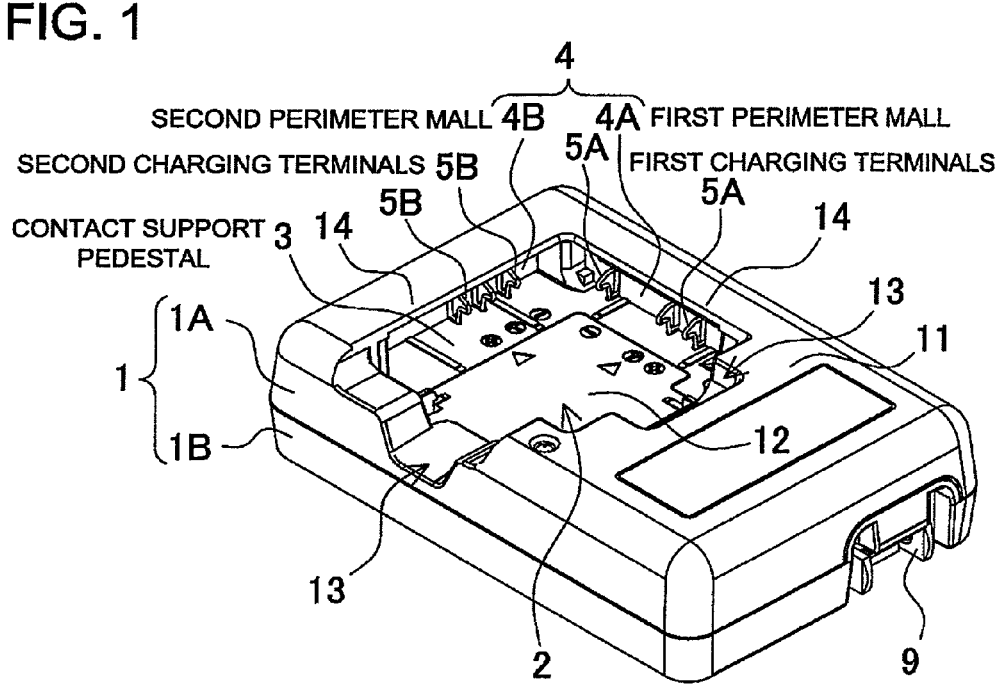

BATTERY CHARGER FOR TWO TYPES OF RECTANGULAR BATTERY PACKS

BACKGROUND OF THE INVENTION

1. Field of the Invention

The present invention relates to a single battery charger that can charge two types of rectangular battery packs having different external shapes.

2. Description of the Related Art

A battery pack is designed with an external shape that is optimum for its application. As a result, different types of battery packs with different external shapes must be charged with special purpose battery chargers. Because these battery chargers are special purpose designs, they are manufactured by multiple-type, low-volume production and have the drawback of high manufacturing cost. This drawback can be eliminated by a configuration that allows different types of battery packs to be charged by a single battery charger. To achieve this, a single battery charger that charges different types of battery packs has been developed. (Refer to Japanese Patent Application Disclosure HEI 11-41826 [1999].)

SUMMARY OF THE INVENTION

The battery charger of Japanese Patent Application HEI 11-41826 [1999] charges different types of battery packs loaded in the same battery pack holding compartment. To charge different types of battery packs with different thicknesses, the holding compartment has a novel structure. Specifically, the holding compartment is provided with charging terminals on one side-wall, and the side-wall opposite the charging terminal side-wall is configured with a step. This establishes a second narrower holding compartment at the bottom of a first holding compartment. This battery charger charges battery packs by loading a thick battery pack in the first holding compartment, and a thin battery pack in the second holding compartment. A battery charger with this structure can charge different types of battery packs with different thicknesses, but it has the drawback that it cannot charge battery packs with different external shapes. In addition, since this battery charger contacts the electrode terminals of different types of battery packs with a single set of charging terminals, the different battery packs must have electrode terminals disposed in specified locations. Consequently, this battery charger also has the drawback that electrode terminals of different types of battery packs cannot be freely disposed without restraining their locations.

The present invention was developed with the object of correcting these types of drawbacks. Thus, it is a primary object of the present invention to provide a battery charger for two types of rectangular battery packs that can charge different types of battery packs having different external shapes, and can charge different types of battery packs having electrode terminals disposed without restraint on the perimeter terminal surface.

The battery charger for two types of rectangular battery packs of the present invention is provided with the following structure to realize the object described above. The battery charger for two types of rectangular battery packs has a case provided with a holding cavity 2 for loading a first rectangular battery pack 30 and a second rectangular battery pack 40 in a detachable fashion. The first rectangular battery pack 30 and second rectangular battery pack 40 have different external shapes and have electrode terminals 32, 42 provided on their perimeter terminal surfaces 31, 41. The holding cavity 2 opening has a rectangular shape, and is provided with a first perimeter wall 4A and a second perimeter wall 4B that are adjacent and perpendicular. First charging terminals 5A, which contact electrode terminals 32 on the first rectangular battery pack 30, and second charging terminals 5B, which contact electrode terminals 42 on the second rectangular battery pack 40, are provided on the first perimeter wall 4A and the second perimeter wall 4B. Further, the shape of the inside of the holding cavity 2 allows the first rectangular battery pack 30 and the second rectangular battery pack 40 to be loaded with their respective perimeter terminal surfaces 31, 41 offset by 90° of rotation for electrode terminal 32, 42 contact with the charging terminals 5. The first rectangular battery pack 30 is loaded in the holding cavity 2 in a detachable fashion with its electrode terminals 32 in contact with the first charging terminals 5A for charging through the first charging terminals 5A. The second rectangular battery pack 40 is loaded in the holding cavity 2 in a detachable fashion with its electrode terminals 42 in contact with the second charging terminals 5B for charging through the second charging terminals 5B.

The battery charger described above has the characteristic that it can charge different types of battery packs with different external shapes, and it can charge different types of battery packs with electrode terminals located without restraint on the perimeter terminal surfaces. This is because the battery charger described above has a holding cavity with a rectangular opening, and first charging terminals, which contact electrode terminals of the first rectangular battery pack, and second charging terminals, which contact electrode terminals of the second rectangular battery pack, are provided on the first perimeter wall and second perimeter wall, which are disposed in a perpendicular fashion. Further, the holding cavity has an internal shape that allows the electrode terminals of each type of battery pack to contact charging terminals when the first rectangular battery pack and second rectangular battery pack are loaded with their terminal surfaces offset by 90° of rotation. This battery charger can charge both the first rectangular battery pack and the second rectangular battery pack. It can charge the first rectangular battery pack loaded in the holding cavity with its electrode terminals in contact with the first charging terminals, and it can charge the second rectangular battery pack loaded in the holding cavity with its electrode terminals in contact with the second charging terminals.

The above and further objects of the present invention as well as the features thereof will become more apparent from the following detailed description to be made in conjunction with the accompanying drawings.

BRIEF DESCRIPTION OF THE DRAWINGS

FIG. 1 is an oblique view of an embodiment of the battery charger for two types of rectangular battery packs of the present invention;

FIG. 2 is an oblique view from the reverse side of the battery charger shown in FIG. 1;

DETAILED DESCRIPTION OF THE PREFERRED EMBODIMENT(S)

Figure 3:
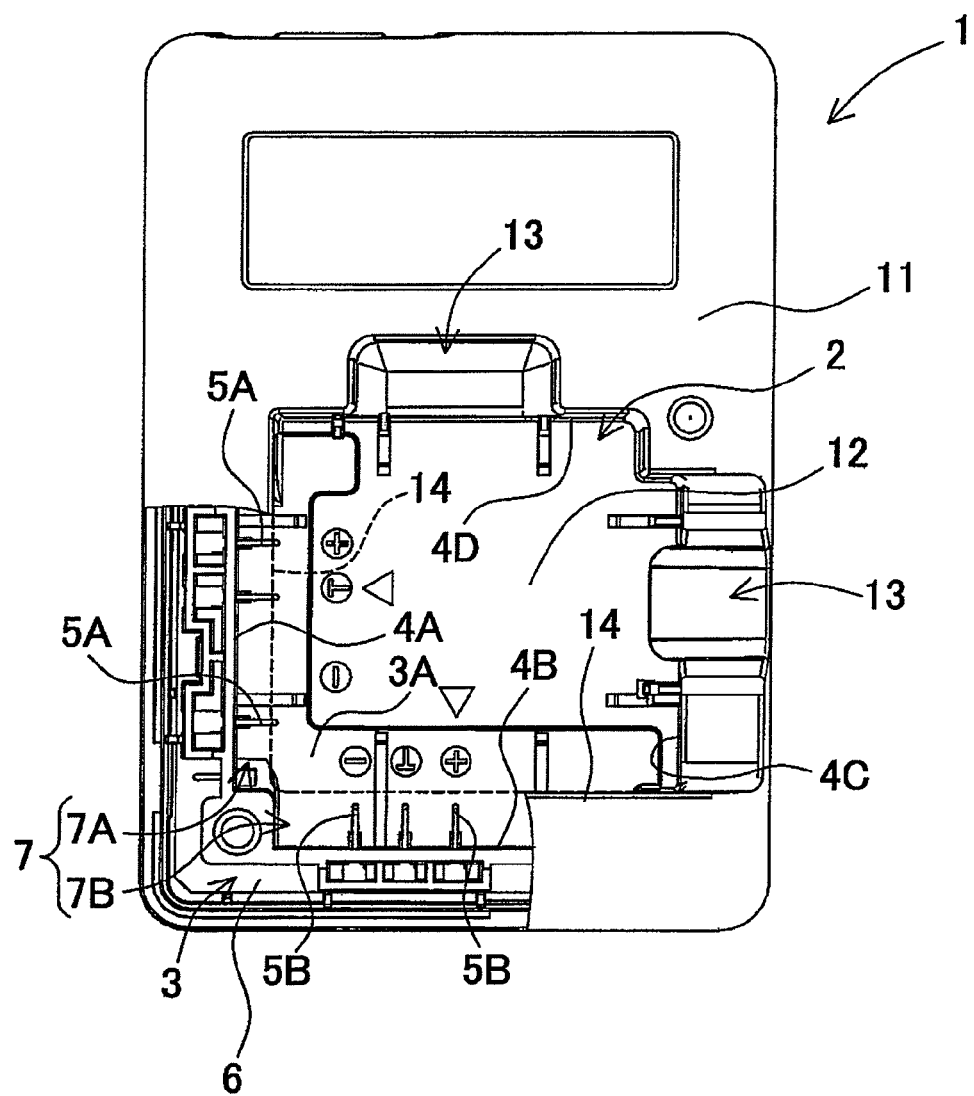
FIG. 3 is a plan view partly in cross-section of the battery charger shown in FIG. 1.

The battery charger for two types of rectangular battery packs of the present invention has a first perimeter wall 4A and second perimeter wall 4B established in a holding cavity 2, and the perimeter walls can be provided with overhanging regions 14 where edges of the rectangular opening project inside the holding cavity 2 to form an undercut configuration. This battery charger has the characteristic that the first rectangular battery pack and the second rectangular battery pack can be loaded in the holding cavity in a detachable fashion, with battery pack electrode terminals in contact with charging terminals, and held for charging in a stable manner that prevents dislodging.

The battery charger for two types of rectangular battery packs of the present invention can be provided with a plastic outer case 1 having a holding cavity 2; a plastic contact support pedestal 3 disposed in a fixed position inside the outer case 1 forming the perimeter walls 4 of the holding cavity 2 and supporting charging terminals 5 that project out from the perimeter walls 4; and a circuit board 6 mounted inside the outer case 1 and connected to charging terminals 5 held by the contact support pedestal 3. In this battery charger, contact support pedestal 3 perimeter walls 4 can be disposed outside the edges of the rectangular opening of the holding cavity 2 to establish overhanging regions 14 where edges of the outer case 1 project inside the rectangular opening of the holding cavity 2.

In the battery charger described above, the plastic outer case and contact support pedestal create an undercut configuration with overhanging regions in perimeter walls of the holding cavity that holds a rectangular battery pack in a detachable fashion. In this battery charger, the plastic outer case can be formed by a mold having a simple structure, and still establish perimeter walls with an undercut configuration. This is because perimeter walls of the outer case do not have to be formed by a mold that forms an undercut shape. The battery charger has a structure that achieves perimeter wall undercut by the relative positions of the contact support pedestal and the outer case. Therefore, it is unnecessary to provide undercut perimeter walls in the outer case, and the outer case can be formed with a simple mold. In particular, both the outer case and the contact support pedestal can be formed with simple molds while establishing an undercut configuration for two perpendicular perimeter walls of the rectangular holding cavity. Further, by establishing undercut with the outer case and the contact support pedestal, the contact support pedestal serves the dual purpose of forming perimeter wall undercut, and there is no requirement for special purpose parts to create the undercut configuration.

Further, the battery charger described above sets charging terminal locations with the contact support pedestal. Therefore, a rectangular battery pack with different electrode terminal locations or pitch can be charged by changing only the contact support pedestal and not changing the outer case. Consequently, this achieves the characteristic that battery chargers for charging various rectangular battery packs can be produced simply and inexpensively in quantity.

The charging terminals 5 of the battery charger for two types of rectangular battery packs of the present invention can be resiliently deformable metal wires. One end of the metal wires can be attached to the circuit board 6 and they can protrude in a flexible manner from guide slits 23 provided in contact support pedestal 3 perimeter walls 4. This battery charger has the characteristic that charging terminals can be disposed in a simple manner in precise positions.

The battery charger for two types of rectangular battery packs of the present invention is provided with detachment grooves 13 that allow removal of a rectangular battery pack loaded in the holding cavity 2. The detachment grooves 13 are provided in a third perimeter wall 4C opposite the first perimeter wall 4A and in a fourth perimeter wall 4D opposite the second perimeter wall 4B. This battery pack has the characteristic that different types of rectangular battery packs loaded in the holding cavity can be easily attached and detached.

The following describes embodiments based on the figures. The battery charger shown in FIGS. 1-10 charges different types of rectangular battery packs. As shown in FIG. 2, the battery charger shown in these figures has an outer case 1 provided with a holding cavity 2 that accepts, in a detachable fashion, a first rectangular battery pack 30 and a second rectangular battery pack 40, which have different external shapes and electrode terminals 32, 42 provided on perimeter terminal surfaces 31, 41.

Figure 5:
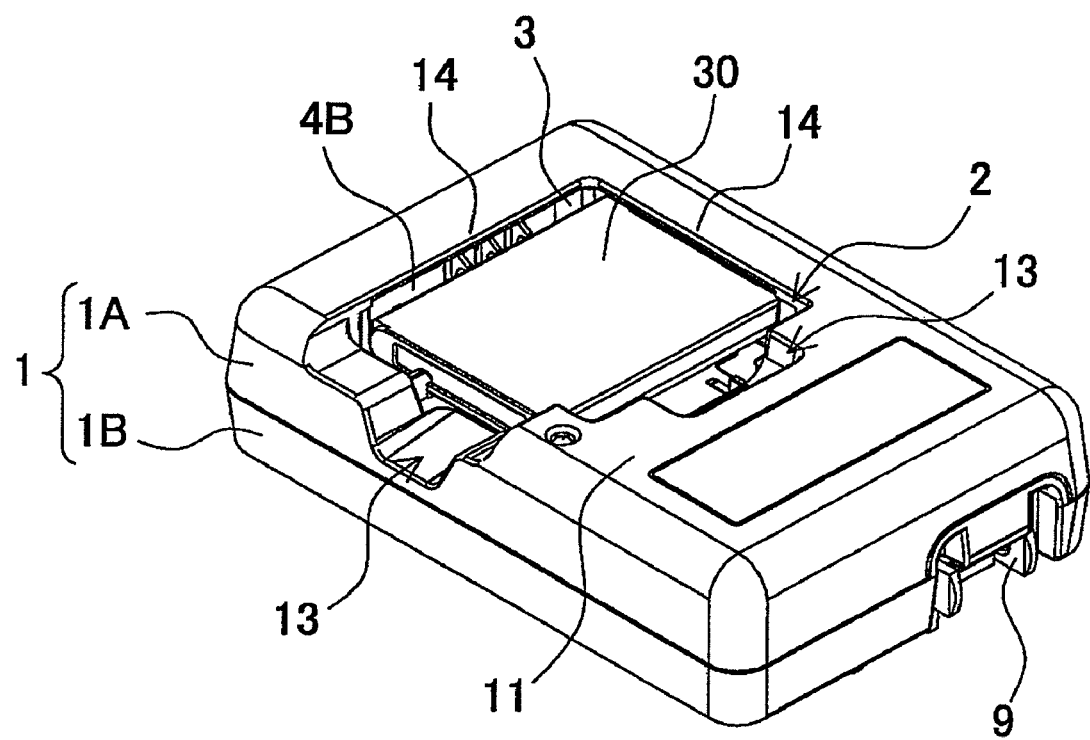
FIG. 5 is an oblique view showing the first type of rectangular battery pack loaded in the battery charger shown in FIG. 1.
Figure 6:
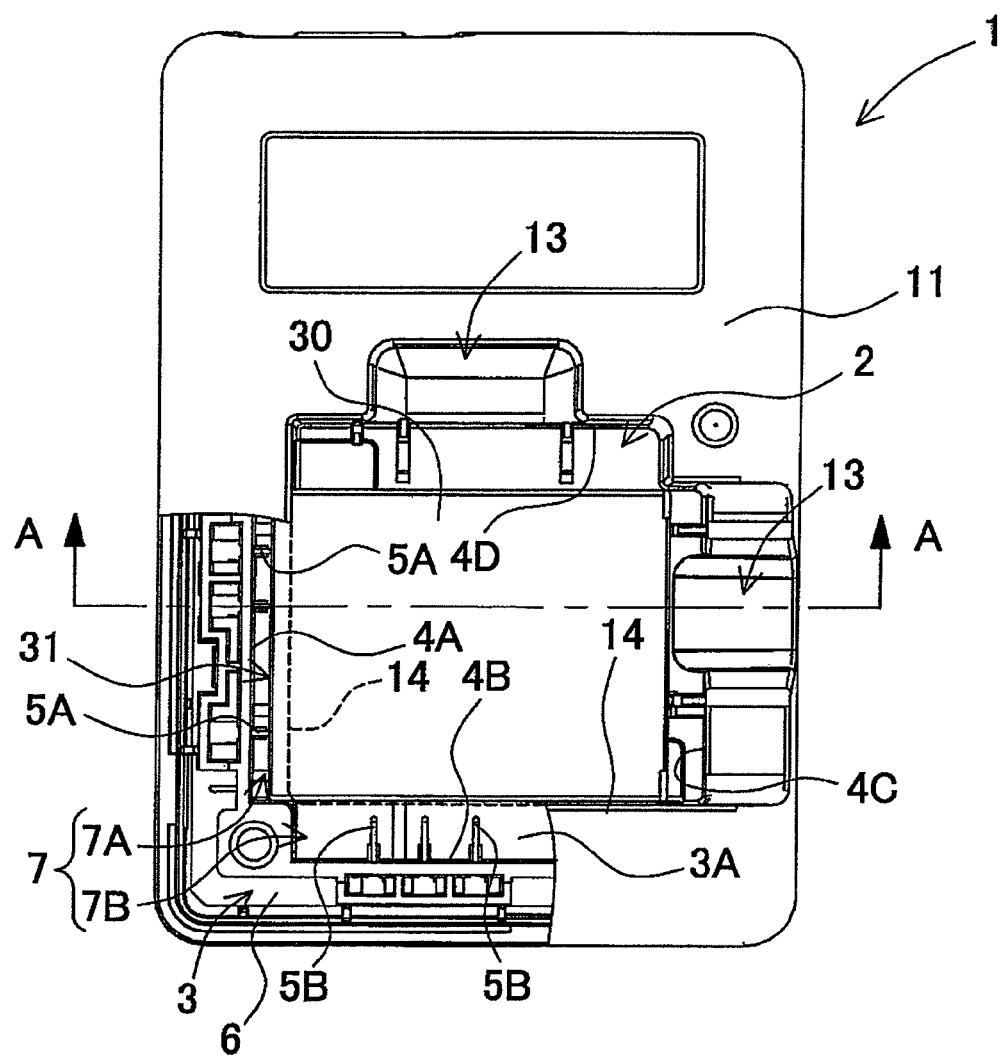
FIG. 6 is a plan view partly in cross-section of the battery charger shown in FIG. 5.
Figure 7:
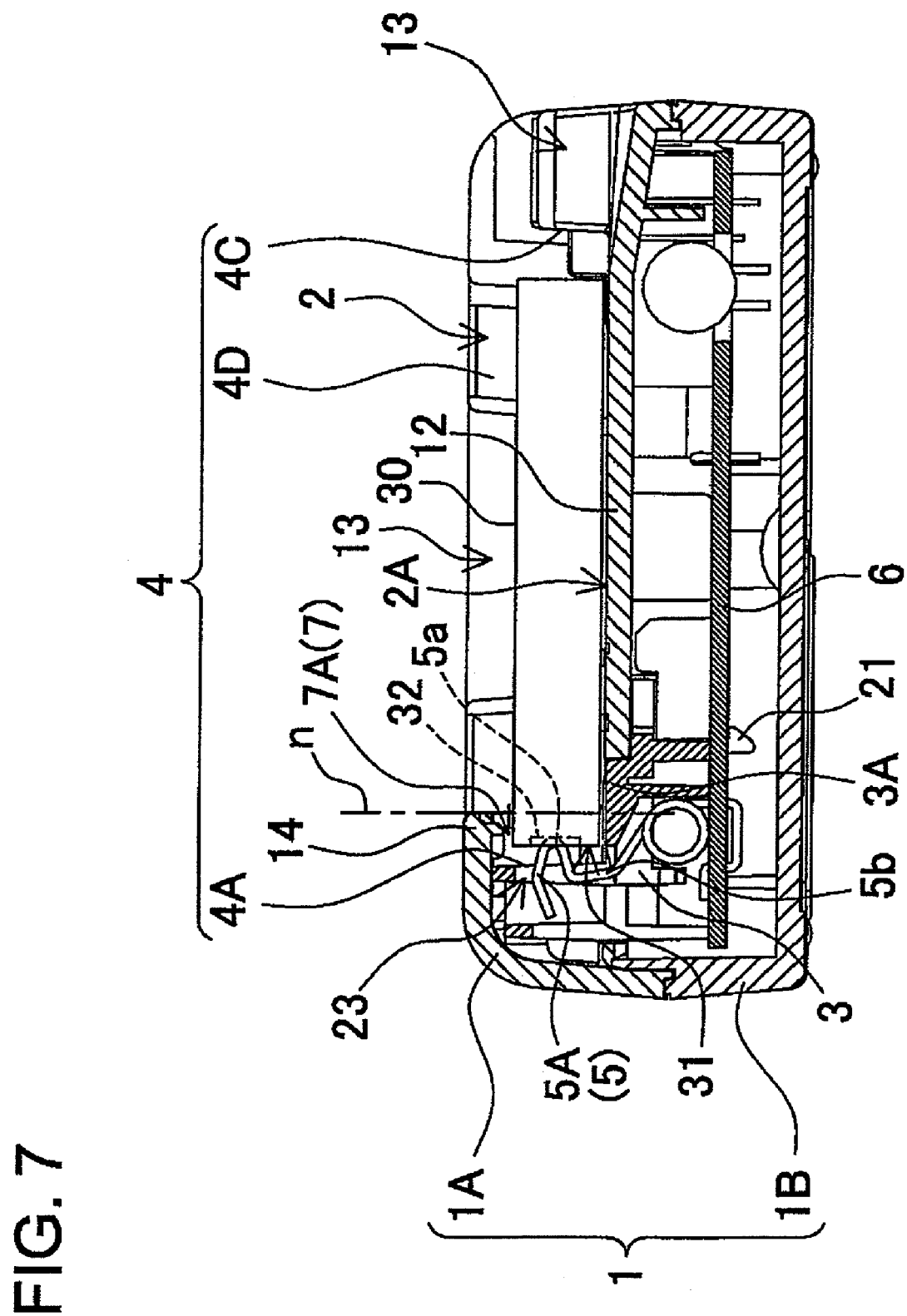
FIG. 7 is a cross-section view of the battery charger shown in FIG. 5 with the cross-section vertically through the line A-A of FIG. 6.
Figure 8:
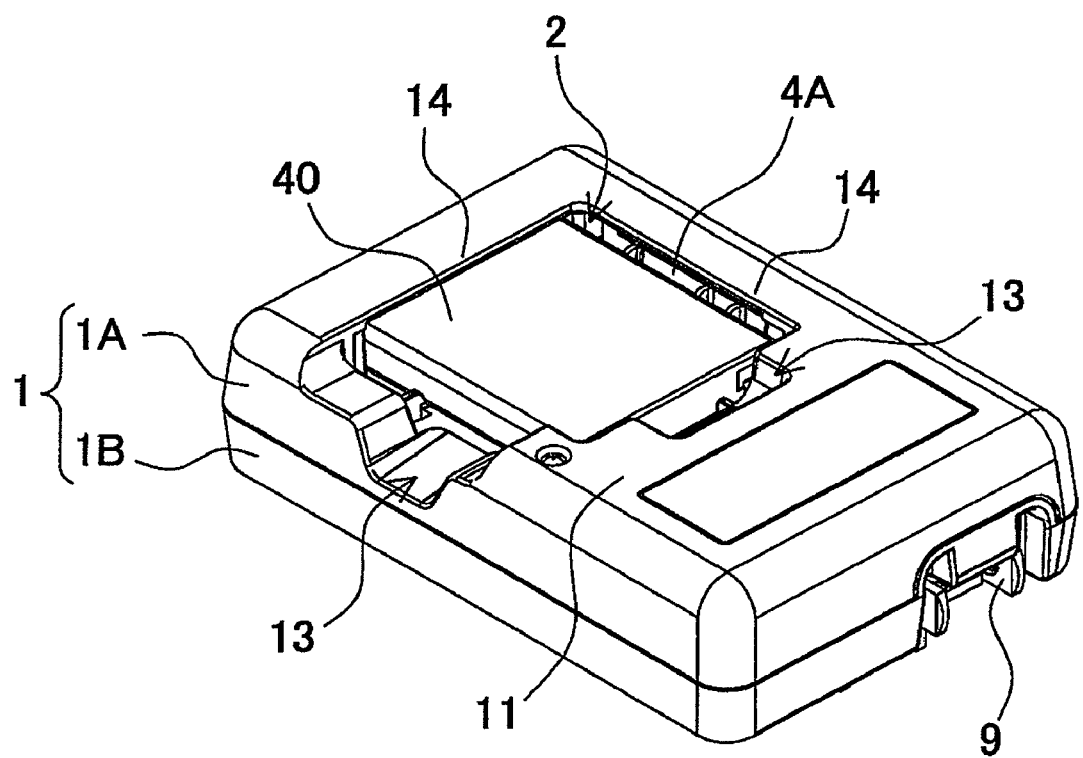
FIG. 8 is an oblique view showing the second type of rectangular battery pack loaded in the battery charger shown in FIG. 1.
Figure 9:
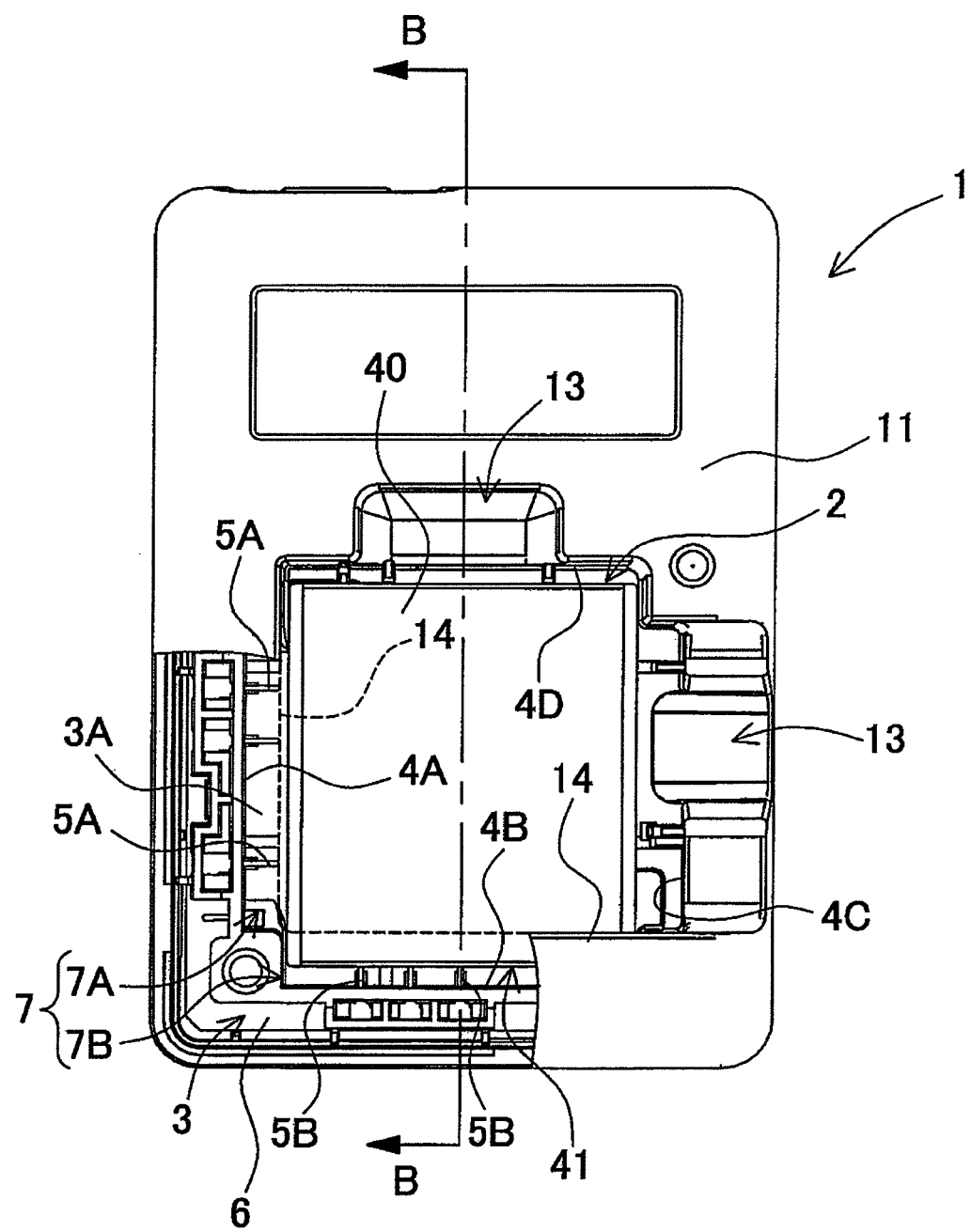
FIG. 9 is a plan view partly in cross-section of the battery charger shown in FIG. 8.
Figure 10:
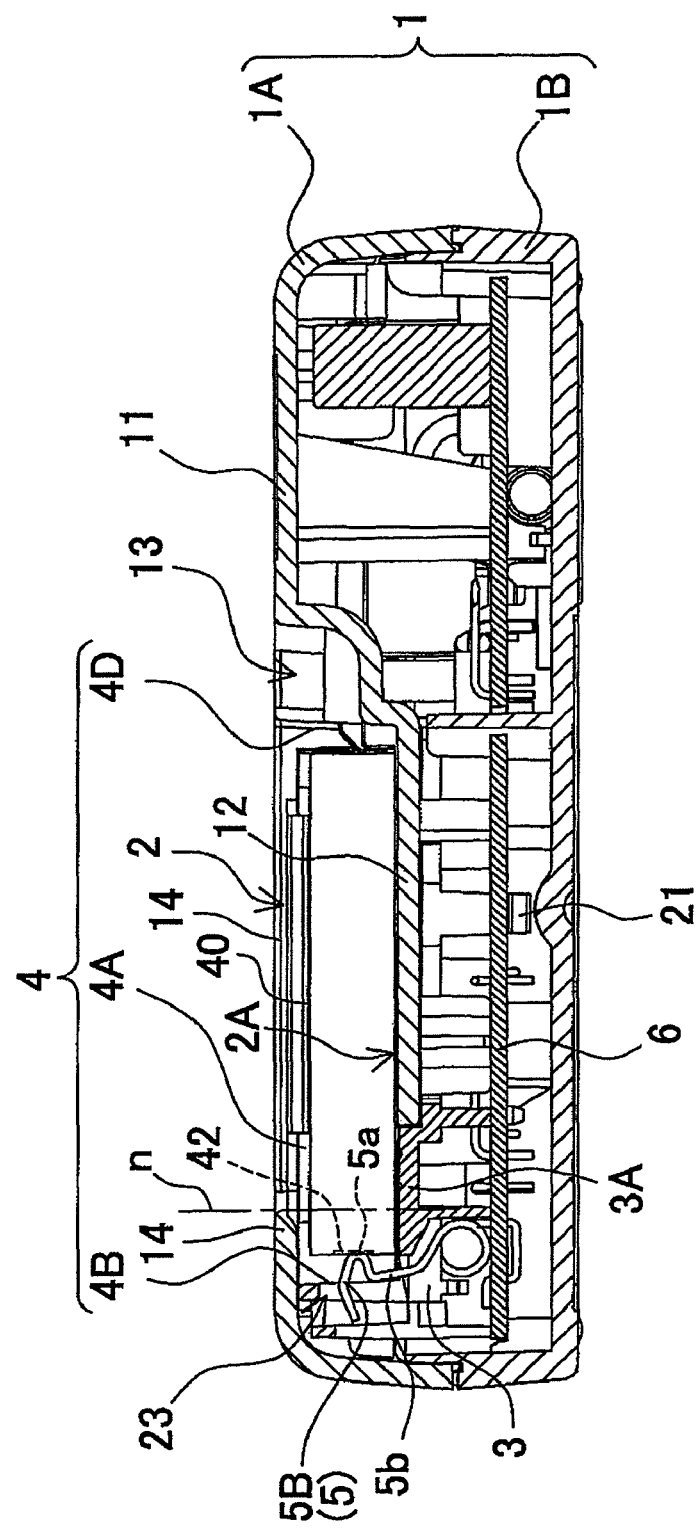
FIG. 10 is a cross-section view of the battery charger shown in FIG. 8 with the cross-section vertically through the line B-B of FIG. 9.

The holding cavity 2 opening has a rectangular inside shape and has the first perimeter wall 4A disposed adjacent to, and perpendicular to the second perimeter wall 4B. First charging terminals 5A are provided in the first perimeter wall 4A to contact first rectangular battery pack 30 electrode terminals 32, and second charging terminals 5B are provided in the second perimeter wall 4B to contact second rectangular battery pack 40 electrode terminals 42. Further, as shown in FIGS. 6 and 9, the holding cavity 2 has an inside shape that allows each set of electrode terminals 32, 42 to contact charging terminals 5 when the first rectangular battery pack 30 and the second rectangular battery pack 40 are loaded with 90° of rotation between respective terminal surfaces 31, 41. As shown in FIGS. 5-7, the first rectangular battery pack 30 is loaded in a detachable manner in the holding cavity 2 with an orientation that puts electrode terminals 32 in contact with the first charging terminals 5A. The first rectangular battery pack 30 is charged through the first charging terminals 5A. As shown in FIGS. 8-10, the second rectangular battery pack 40 is loaded in a detachable manner in the holding cavity 2 with an orientation that puts electrode terminals 42 in contact with the second charging terminals 5B. The second rectangular battery pack 40 is charged through the second charging terminals 5B.

Figure 4:
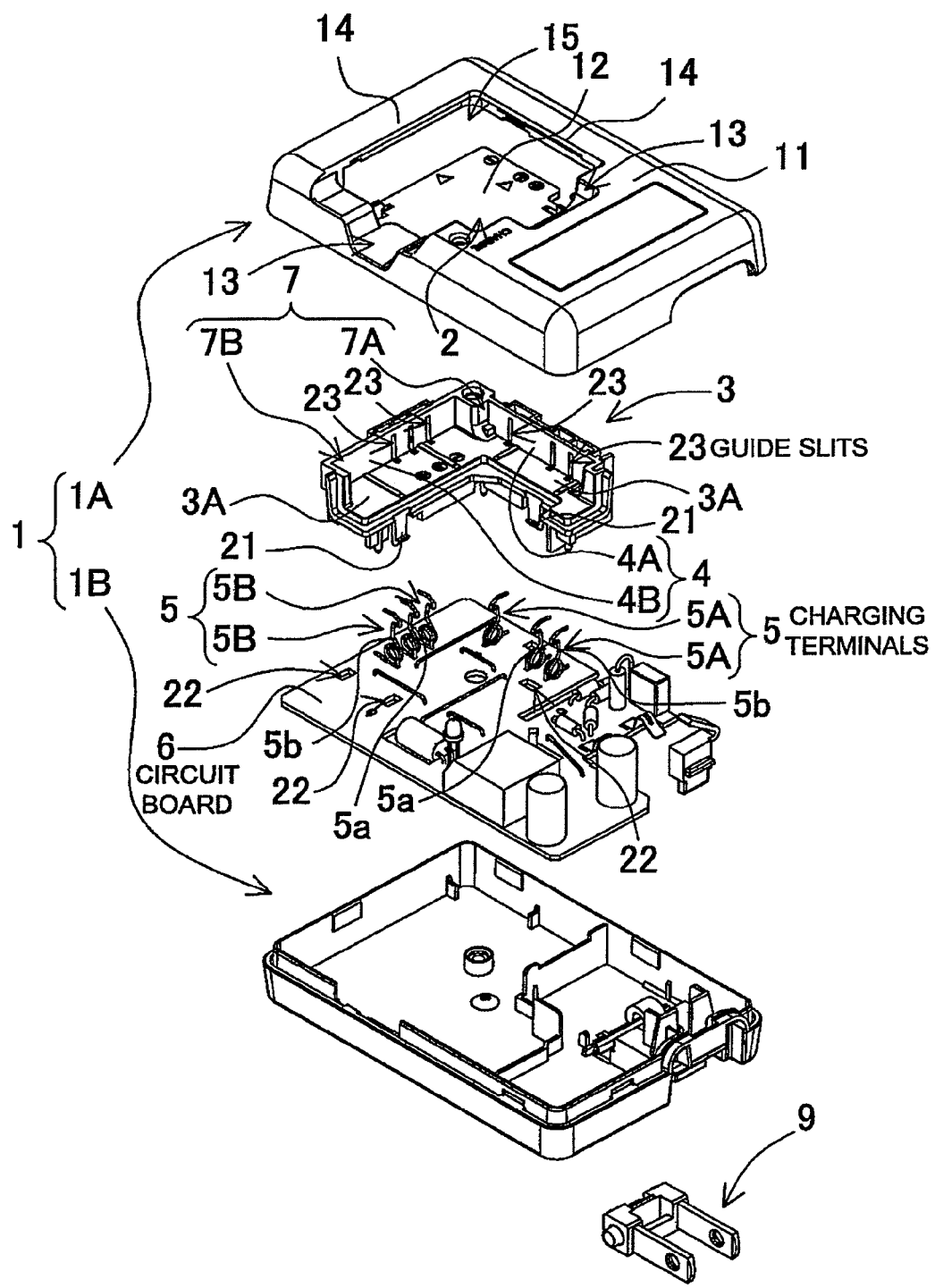
FIG. 4 is an exploded oblique view of the battery charger shown in FIG. 1.

As shown in the exploded oblique view of FIG. 4, the battery charger described above is provided with a plastic outer case 1 with a holding cavity 2, a plastic contact support pedestal 3 disposed inside the outer case 1 forming the perimeter walls 4 of the holding cavity 2 and supporting charging terminals 5 that project out from the perimeter walls 4, and a circuit board 6 mounted inside the outer case 1 attached with the contact support pedestal 3 and connected to the charging terminals 5.

The outer case 1 is made of plastic with an upper case 1A and a lower case 1B formed separately then joined together. The outer case 1 of the figures has an upper case 1A and lower case 1B that are rectangular, planar, and are provided with perimeter side-walls formed as single-piece structures for upper and lower case 1A, 1B attachment. The lower case 1B has a power plug 9 connected to its bottom surface in a retractable folding manner. The power plug 9 can be detachably inserted into a commercial power outlet.

The top surface of the upper case 1A is open to establish the holding cavity 2. A depression is provided in part of a surface plate 11 of the upper case 1A, and this depression establishes the holding cavity 2. The holding cavity 2 is a rectangular opening, and a bottom plate 12, which is the part of the surface plate 11 that forms the depression, has a rectangular shape. The holding cavity 2 has a shape that can accept the first rectangular battery pack 30 and the second rectangular battery pack 40 when loaded with 90° of offset rotation in their terminal surfaces 31, 41. In the rectangular holding cavity 2 shown in FIG. 2, the upper right third perimeter wall 4C and upper left fourth perimeter wall 4D are formed perpendicular to the bottom surface 2A of the holding cavity 2. This configuration allows rectangular battery packs to be loaded in the holding cavity 2 in a manner that prevents dislodging. However, the gap is narrow between a rectangular battery pack and the vertical surface of the third perimeter wall 4C or the fourth perimeter wall 4D, and it can be difficult to remove a rectangular battery pack from the holding cavity 2. Therefore, the upper case 1A of the figures has detachment grooves 13 provided in the third perimeter wall 4C and the fourth perimeter wall 4D for removal of a rectangular battery pack loaded in the holding cavity 2. The detachment grooves 13 are formed in shapes that widen the gaps between a rectangular battery pack and upper edges of the holding cavity 2. The detachment grooves 13 allow the user to easily remove a rectangular battery pack from the holding cavity 2 with a finger or other implement.

The cross-section views of FIGS. 7 and 10 show cross-sections vertically through the first perimeter wall 4A and second perimeter wall 4B respectively. As shown in these and other figures, overhanging regions 14 that project inside the rectangular holding cavity 2 are provided at the edge of the holding cavity 2 opening giving the first perimeter wall 4A and second perimeter wall 4B undercut configurations. A holding cavity 2 with an undercut configuration can prevent a rectangular battery pack loaded in the holding cavity 2 from dislodging. In particular, a rectangular battery pack loaded in the holding cavity with charging terminals 5 pressing against it in a flexible manner can be prevented from dislodging.

To implement the undercut configuration for the first perimeter wall 4A and the second perimeter wall 4B, the outer case 1 has those two perimeter walls 4 of the rectangular holding cavity 2 formed by the contact support pedestal 3. To dispose the contact support pedestal 3 in a fixed position inside the holding cavity 2, the upper case 1A of the outer case 1 is provided with a voided region 15 that aligns with the contact support pedestal 3. The voided region 15 is provided at the locations of the first perimeter wall 4A and the second perimeter wall 4B in the holding cavity 2. The contact support pedestal 3 is inserted into the voided region 15 to establish the undercut structure with overhanging regions 14 formed by the upper case 1A of the outer case 1 and perimeter walls 4 formed by the contact support pedestal 3. As shown in the cross-sections of FIGS. 7 and 10, the voided region 15 opens a gap between the perimeter of the bottom plate 12 and the surface plate 11 of the upper case 1A, which is the outer case 1. As shown by the vertical lines "n" in FIGS. 7 and 10, the edge of the opening of the voided region 15 is established in a manner that removes part of the bottom plate 12. Specifically, the voided region 15 is established inward from the tip of the overhanging region 14 inside the rectangular holding cavity 2. An upper case 1A of this shape can be molded with a mold having a simple structure. This is because the upper case 1A can be formed from plastic by a vertically segmented mold that opens between upper and lower sections. In particular, this structure has the characteristic that the upper case 1A can be formed with a simple mold while establishing an undercut configuration for the first perimeter wall 4A and the second perimeter wall 4B of the holding cavity 2.

The contact support pedestal 3 aligned in the voided region 15 forms the first perimeter wall 4A and second perimeter wall 4B of the holding cavity 2. The contact support pedestal 3 disposes perimeter walls 4 outside the edges of the holding cavity 2 opening, and the edges of the holding cavity 2 opening formed by the upper case 1A establish the overhanging regions 14 that protrude inside the rectangular holding cavity 2. As a result of this structure, an undercut configuration is established for two adjacent perimeter walls 4 of the holding cavity 2; namely for the first perimeter wall 4A and the second perimeter wall 4B.

The contact support pedestal 3 is formed entirely of insulating plastic. This contact support pedestal 3 is mounted on the circuit board 6 to dispose the charging terminals 5 in fixed positions. In addition, the contact support pedestal 3 is disposed in a fixed position with respect to the outer case 1, and forms the first perimeter wall 4A and second perimeter wall 4B, which are adjacent perpendicular perimeter walls 4 of the rectangular holding cavity 2. The first perimeter wall 4A and second perimeter wall 4B are disposed as two adjacent sides of a rectangle. Therefore, the contact support pedestal 3 that forms the first perimeter wall 4A and second perimeter wall 4B has an overall planar outline that is L-shaped.

In addition to establishing the perimeter walls 4 of the holding cavity 2, the contact support pedestal 3 of the figures is provided with a horizontal section 3A formed as a single piece with the contact support pedestal 3 that forms part of the bottom surface 2A of the holding cavity 2. The horizontal section 3A is disposed in a horizontal orientation and is perpendicular to the perimeter walls 4. Consequently, a contact support pedestal 3 provided with a horizontal section 3A and perimeter walls 4 has a vertical cross-section that is also L-shaped. The horizontal section 3A is formed in a shape that closes off the part of the bottom plate 12 removed by the voided region 15. Further, the horizontal section 3A is formed to dispose its upper surface in the same plane as the bottom plate 12 when the contact support pedestal 3 is aligned in a fixed position in the voided region 15.

The contact support pedestal 3 of the figures is mounted in a fixed position in the outer case 1 via the circuit board 6. In this configuration, the contact support pedestal 3 and charging terminals 5 are both directly connected to the circuit board 6, and the contact support pedestal 3, charging terminals 5, and circuit board 6 can be joined as an assembly for mounting in the outer case 1. Consequently, this configuration has the characteristic that it can be assembled in a simple efficient manner. Further, the contact support pedestal 3 shown in FIG. 4 is provided with a plurality of connecting hooks 21 formed as a single piece with the contact support pedestal 3 for connection in a fixed position on the circuit board 6. Correspondingly, the circuit board 6 is provided with connecting holes 22 for inserting the connecting hooks 21 to mount the contact support pedestal 3 in a fixed position. A contact support pedestal 3 with this structure can be attached in a fixed position on the circuit board 6 by simply inserting connecting hooks 21 in the circuit board 6 connecting holes 22. However, although not illustrated, the contact support pedestal can also be directly attached in a fixed position in the outer case without intervention of the circuit board. This structure can be realized by providing a contact support pedestal and outer case that fit tightly together allowing the contact support pedestal to be mounted in a fixed position in the outer case.

The contact support pedestal 3 disposes charging terminals 5 in specified positions. Consequently, the contact support pedestal 3 disposes first charging terminals 5A in the first perimeter wall 4A to contact first rectangular battery pack 30 electrode terminals 32, and disposes second charging terminals 5B in the second perimeter wall 4B to contact second rectangular battery pack 40 electrode terminals 42. To dispose the charging terminals 5 in specified positions, the contact support pedestal 3 is provided with guide slits 23 that guide the metal wire charging terminals 5 in and out of the perimeter walls 4. The contact support pedestal 3 shown in FIG. 4 is provided with three rows of guide slits 23, which extend in the vertical direction of the figure, in both the first perimeter wall 4A and the second perimeter wall 4B. This serves to dispose sets of three rows of charging terminals 5 in specified positions. Guide slits 23 are provided in the first perimeter wall 4A to dispose the first charging terminals 5A in positions that contact first rectangular battery pack 30 electrode terminals 32, and are provided in the second perimeter wall 4B to dispose the second charging terminals 5B in positions that contact second rectangular battery pack 40 electrode terminals 42. Guide slits 23 are made wider than the outside diameter of the charging terminal 5 metal wire, and guide slits 23 guide metal wire charging terminals 5 in a manner allowing them to move freely in and out of the perimeter walls 4.

The holding cavity 2 of FIGS. 6 and 9 is configured such that the second rectangular battery pack 40 does not contact the first charging terminals 5A, and the first rectangular battery pack 30 does not contact the second charging terminals 5B. If the first rectangular battery pack 30 loaded in the holding cavity 2 contacts the second charging terminals 5B, it can damage the second charging terminals 5B. This is because if the first rectangular battery pack 30 being loaded in the holding cavity 2 contacts the second charging terminals 5B, forces applied to the second charging terminals 5B in a lateral direction with respect to the guide slits 23 can cause damage such as deforming the charging terminals. The first rectangular battery pack 30 is loaded in a manner that contacts first charging terminals 5A with electrode terminals 32, namely the battery pack is loaded in the holding cavity 2 while moving it in a direction perpendicular to the terminal surface 31. A direction perpendicular to the terminal surface 31 of the first rectangular battery pack 30 is also perpendicular to the direction that the second charging terminals 5B protrude in a flexible fashion. The second charging terminals 5B can move freely in the direction of flexible protrusion, but when lateral forces are applied perpendicular to the direction of protrusion, charging terminal lateral movement is restrained by the guide slits 23 and detrimental effects such as deformation can result. Since the first charging terminals 5A and the second charging terminals 5B function in the same manner, if the second rectangular battery pack 40 contacts the first charging terminals 5A while being loaded in the holding cavity 2, the same detrimental effects can occur. As shown in the battery charger of FIGS. 6 and 9, to prevent these detrimental effects, the first rectangular battery pack 30 is loaded in the holding cavity 2 in a manner that does not contact the second charging terminals 5B, and the second rectangular battery pack 40 is loaded in a manner that does not contact the first charging terminals 5A. To achieve this, the contact support pedestal 3 is provided with contact depressions 7, and the charging terminals 5 are disposed in those contact depressions 7. A first contact depression 7A provided for the first charging terminals 5A is made to accept first rectangular battery pack 30 insertion but not second rectangular battery pack 40 insertion, and first charging terminals 5A are put in contact with first rectangular battery pack 30 electrode terminals 32. A second contact depression 7B provided for the second charging terminals 5B is made to accept second rectangular battery pack 40 insertion but not first rectangular battery pack 30 insertion, and second charging terminals 5B are put in contact with second rectangular battery pack 40 electrode terminals 42.

Charging terminals 5 are resiliently deformable metal wires and have one end attached to the circuit board 6 by a method such as solder attachment. In addition, each charging terminal 5 metal wire is bent to provide a contact region 5a to contact rectangular battery pack electrode terminals 32, 42, and a flexible arm 5b to press the contact region 5a flexibly against the rectangular battery pack electrode terminals 32, 42. The metal wires of these charging terminals 5 are aligned in the guide slits 23 of the contact support pedestal 3 with the contact regions 5a projecting outward in a flexible manner to resiliently press against rectangular battery pack electrode terminals 32, 42. Although one end of the metal wire charging terminals 5 of the figures is attached to the circuit board 6, a structure with one end of the charging terminals attached to the contact support pedestal and contact regions flexibly protruding from the guide slits is also possible. Charging terminals attached to the contact support pedestal can be connected to the circuit board via leads (not illustrated), they can be connected to a charging circuit (not illustrated) housed in the outer case, or they can be connected to a power supply line (not illustrated) input from an external source to allow rectangular battery pack charging.

The circuit board 6 has surface mounted electronic components to implement a charging circuit that converts commercial power input from the power plug 9 to voltage and current for charging the rectangular battery pack, a control circuit that detects rectangular battery pack full charge and stops charging, and other circuitry. This circuit board 6 has metal wire charging terminals 5 connected to the output-side of the surface mounted charging circuit. To charge both a first rectangular battery pack 30 and a second rectangular battery pack 40, the battery charger has first charging terminals 5A and second charging terminals 5B connected to the charging circuit. The charging circuit is provided with circuitry to charge the first rectangular battery pack 30 and the second rectangular battery pack 40 with optimal charging current and voltage. Consequently, a first rectangular battery pack 30 and a second rectangular battery pack 40 with different capacities or different charging voltages can both be charged with optimum voltage and current.

The circuit board 6 is made to fit tightly in the lower case 1B of the outer case 1 and is mounted in a fixed position in the lower case 1B. The circuit board 6 is mounted in a fixed position in the outer case 1 via set screws screwed into the lower case 1B, via hooks or latches, or by sandwiching the circuit board 6 between the upper case 1A and lower case 1B. Finally, in the case of minor dimensional changes to the first rectangular battery pack 30 and second rectangular battery pack 40 of the present embodiment, primarily it is possible to change only the dimensions of the contact support pedestal 3 with other parts remaining unchanged.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-285960 filed in Japan on Nov. 6, 2008, the content of which is incorporated herein by reference.

What is claimed is:

1. A battery charger for two types of rectangular battery packs, the battery charger comprising:

an outer case provided with a holding cavity that accepts, in a detachable fashion, a first rectangular battery pack and a second rectangular battery pack, the first and second rectangular battery packs having different external shapes and electrode terminals provided on respective perimeter terminal surfaces, the holding cavity has a rectangular opening with a first perimeter wall and second perimeter wall disposed in an adjacent, perpendicular fashion;

first charging terminals to contact first rectangular battery pack electrode terminals, and second charging terminals to contact second rectangular battery pack electrode terminals, the first charging terminals and second charging terminals being provided on the first perimeter wall and second perimeter wall respectively, wherein the holding cavity has an inside shape that allows the electrode terminals to contact the first and second charging terminals when the first rectangular battery pack and the second rectangular battery pack are loaded with 90 degrees of rotation between the respective perimeter terminal surfaces, and the first rectangular battery pack is charged through the first charging terminals when loaded in the holding cavity with the first rectangular battery pack electrode terminals in contact with the first charging terminals, and the second rectangular battery pack is charged through the second charging terminals when loaded in the holding cavity with the second rectangular battery pack electrode terminals in contact with the second charging terminals.

2. The battery charger for two types of rectangular battery packs as cited in claim 1 wherein the first perimeter wall established in the holding cavity is provided with an overhanging region that projects inside the rectangular opening.

3. The battery charger for two types of rectangular battery packs as cited in claim 1 wherein the second perimeter wall established in the holding cavity is provided with an overhanging region that projects inside the rectangular opening.

4. The battery charger for two types of rectangular battery packs as cited in claim 1 wherein the first perimeter wall and the second perimeter wall established in the holding cavity are provided with overhanging regions that project inside the rectangular opening.

5. The battery charger for two types of rectangular battery packs as cited in claim 1 provided with the outer case made of plastic and having the holding cavity; and a plastic contact support pedestal disposed in a fixed position inside the outer case, forming the perimeter walls of the holding cavity, and supporting the charging terminals that project out from the perimeter walls.

6. The battery charger for two types of rectangular battery packs as cited in claim 5 wherein the first perimeter wall and second perimeter wall established in the holding cavity are formed by the contact support pedestal.

7. The battery charger for two types of rectangular battery packs as cited in claim 5 wherein the outer case is provided with a voided region that aligns the contact support pedestal at the locations of the first perimeter wall and the second perimeter wall of the holding cavity; and the contact support pedestal is inserted into the voided region to establish the perimeter walls.

8. The battery charger for two types of rectangular battery packs as cited in claim 7 wherein the voided region opens a gap between the perimeter of the bottom plate and the surface plate of the outer case.

9. The battery charger for two types of rectangular battery packs as cited in claim 8 wherein the first perimeter wall and the second perimeter wall provided in the holding cavity have overhanging regions that project inside the rectangular opening, and the edges of the voided region are established inside the rectangular opening inward from the tips of the overhanging regions.

10. The battery charger for two types of rectangular battery packs as cited in claim 5 provided with the plastic outer case having the holding cavity; a plastic contact support pedestal disposed in a fixed position inside the outer case, forming the perimeter walls of the holding cavity, and supporting the charging terminals that project out from the perimeter walls; and a circuit board mounted inside the outer case and connected to charging terminals held by the contact support pedestal.

11. The battery charger for two types of rectangular battery packs as cited in claim 10 wherein the contact support pedestal is mounted on the circuit board to dispose the charging terminals in fixed positions, and the contact support pedestal is attached in a fixed position in the outer case via the circuit board.

12. The battery charger for two types of rectangular battery packs as cited in claim 10 wherein the contact support pedestal has guide slits that flexibly project the charging terminals from the perimeter walls; and the charging terminals are resiliently deformable metal wires with one end attached to the circuit board protruding in a flexible manner from the guide slits provided in the contact support pedestal perimeter walls.

13. The battery charger for two types of rectangular battery packs as cited in claim 5 wherein contact support pedestal perimeter walls are disposed outside the edges of the rectangular opening of the holding cavity to establish overhanging regions where edges of the outer case project inside the rectangular opening of the holding cavity.

14. The battery charger for two types of rectangular battery packs as cited in claim 1 wherein the outer case has an upper case and a lower case that are joined together after being formed separately.

15. The battery charger for two types of rectangular battery packs as cited in claim 14 wherein the lower case has a power plug connected to its bottom surface in a retractable folding manner, and the power plug can be inserted in a removable fashion into a commercial power outlet.

16. The battery charger for two types of rectangular battery packs as cited in claim 8 wherein the upper case is provided with the holding cavity that opens its upper surface.

17. The battery charger for two types of rectangular battery packs as cited in claim 14 wherein the upper case is provided with a depression in part of its surface plate, and that depression establishes the rectangular holding cavity.

18. The battery charger for two types of rectangular battery packs as cited in claim 14 wherein the upper case has a third perimeter wall and a fourth perimeter wall provided in positions opposite the first perimeter wall and the second perimeter wall.

19. The battery charger for two types of rectangular battery packs as cited in claim 18 wherein detachment grooves that allow removal of a rectangular battery pack from the holding cavity are provided in the third perimeter wall positioned opposite the first perimeter wall and in the fourth perimeter wall positioned opposite the second perimeter wall.

20. The battery charger for two types of rectangular battery packs as cited in claim 19 wherein the detachment grooves are formed in shapes that widen the gaps between a rectangular battery pack and the upper edges of the holding cavity.

21. The battery charger for two types of rectangular battery packs as cited in claim 1 wherein the holding cavity is configured such that the second rectangular battery pack does not contact the first charging terminals, and the first rectangular battery pack does not contact the second charging terminals.

* * * * *